United States Patent
Horesh et al.

(10) Patent No.: US 11,886,188 B2
(45) Date of Patent: Jan. 30, 2024

(54) TECHNIQUES FOR ENVIRONMENTAL PARAMETER MAPPING

(71) Applicant: R-Go Robotics LTD., Caesarea (IL)

(72) Inventors: Nizan Horesh, Caesarea (IL); Tal Levy, Tel Aviv (IL); Assaf Agmon, Hod Hasharon (IL)

(73) Assignee: R-GO ROBOTICS, LTD., Caesarea (IL)

( * ) Notice: Subject to any disclaimer, the term of this patent is extended or adjusted under 35 U.S.C. 154(b) by 261 days.

(21) Appl. No.: 17/344,268

(22) Filed: Jun. 10, 2021

(65) Prior Publication Data

US 2022/0397899 A1 Dec. 15, 2022

(51) Int. Cl.
| | |
|---|---|
| G01C 21/00 | (2006.01) |
| G05D 1/00 | (2006.01) |
| A01D 34/00 | (2006.01) |
| A01D 101/00 | (2006.01) |

(52) U.S. Cl.
CPC ......... *G05D 1/0088* (2013.01); *A01D 34/008* (2013.01); *G01C 21/3848* (2020.08); *A01D 2101/00* (2013.01); *G05D 2201/0208* (2013.01)

(58) Field of Classification Search
None
See application file for complete search history.

(56) References Cited

U.S. PATENT DOCUMENTS

| | | | |
|---|---|---|---|
| 7,428,455 B2 | 9/2008 | Corcoran | |
| 7,855,683 B2 | 12/2010 | Razoumov et al. | |
| 10,901,419 B2 | 1/2021 | Liu et al. | |
| 2004/0225423 A1 | 11/2004 | Carlson et al. | |
| 2014/0005933 A1 | 1/2014 | Fong et al. | |
| 2018/0239355 A1* | 8/2018 | Lee | G08G 1/166 |
| 2019/0164331 A1 | 5/2019 | Mccombe et al. | |
| 2020/0029496 A1* | 1/2020 | Nam | G05D 1/0274 |
| 2020/0158520 A1* | 5/2020 | Yasui | G01C 21/3848 |
| 2021/0100160 A1* | 4/2021 | Kang | A01D 34/008 |
| 2021/0146917 A1* | 5/2021 | Nagashima | B60W 10/20 |

FOREIGN PATENT DOCUMENTS

| | | |
|---|---|---|
| EP | 2884364 A1 | 6/2015 |
| JP | 6427503 B2 | 11/2018 |
| JP | 6445995 B2 | 12/2018 |
| KR | 100784277 B1 | 12/2007 |
| KR | 100982462 B1 | 9/2010 |

OTHER PUBLICATIONS

"European Search Report", European Patent Office, Munich, Germany, dated Nov. 7, 2022.

* cited by examiner

*Primary Examiner* — James M McPherson
(74) *Attorney, Agent, or Firm* — M&B IP Analysts, LLC

(57) ABSTRACT

A system and method for environmental parameter mapping. A method includes adding at least one entry to a mapping data structure, wherein each entry includes a position of a robotic device and at least one corresponding environmental parameter for the respective position of the robotic device, wherein each environmental parameter of each entry indicates an attribute of an environment at the corresponding position and is based on at least one sensor signal captured at the corresponding position; and sending at least one command to the robotic device, wherein the at least one command is determined based on the mapping data structure and includes at least one command to navigate.

21 Claims, 7 Drawing Sheets

TECHNIQUES FOR ENVIRONMENTAL PARAMETER MAPPING

TECHNICAL FIELD

The present disclosure relates generally to spatially consistent mapping, and more specifically to utilizing mapping of environmental parameters for improved accuracy determination of navigation and related decisions.

BACKGROUND

Sensor fusion is a process by which data collected from different sources is combined. The combination of data effectively enriches the data since the combined dataset reveals more information than data from a single data source would reveal individually. A goal and benefit of sensor fusion is reducing uncertainty of data from any given source. More specifically, goals of sensor fusion include increasing accuracy, reducing variance, and improving robustness. Data from a second sensor can be used to provide, for example, more complete information when combined with data from a first sensor, or to verify the accuracy of data from the first sensor.

An example use of sensor fusion is for navigation. For example, Global Positioning System (GPS) data (i.e., data from a GPS) may be fused with data from an inertial navigation system. Such sensor fusion can allow for deriving more complicated information using multiple relatively low complexity sensors. As navigation systems are used for purposes requiring increasingly precise navigation, techniques for further improving results of sensor fusion are becoming more desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for environmental parameter mapping. The method comprises: adding at least one entry to a mapping data structure, wherein each entry includes a position of a robotic device and at least one corresponding environmental parameter for the respective position of the robotic device, wherein each environmental parameter of each entry indicates an attribute of an environment at the corresponding position and is based on at least one sensor signal captured at the corresponding position; and sending at least one command to the robotic device, wherein the at least one command is determined based on the mapping data structure and includes at least one command to navigate.

Certain embodiments disclosed herein also include a non-transitory computer readable medium having stored thereon causing a processing circuitry to execute a process, the process comprising: adding at least one entry to a mapping data structure, wherein each entry includes a position of a robotic device and at least one corresponding environmental parameter for the respective position of the robotic device, wherein each environmental parameter of each entry indicates an attribute of an environment at the corresponding position and is based on at least one sensor signal captured at the corresponding position; and sending at least one command to the robotic device, wherein the at least one command is determined based on the mapping data structure and includes at least one command to navigate.

Certain embodiments disclosed herein also include a system for environmental parameter mapping. The system comprises: a processing circuitry; and a memory, the memory containing instructions that, when executed by the processing circuitry, configure the system to: add at least one entry to a mapping data structure, wherein each entry includes a position of a robotic device and at least one corresponding environmental parameter for the respective position of the robotic device, wherein each environmental parameter of each entry indicates an attribute of an environment at the corresponding position and is based on at least one sensor signal captured at the corresponding position; and send at least one command to the robotic device, wherein the at least one command is determined based on the mapping data structure and includes at least one command to navigate.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
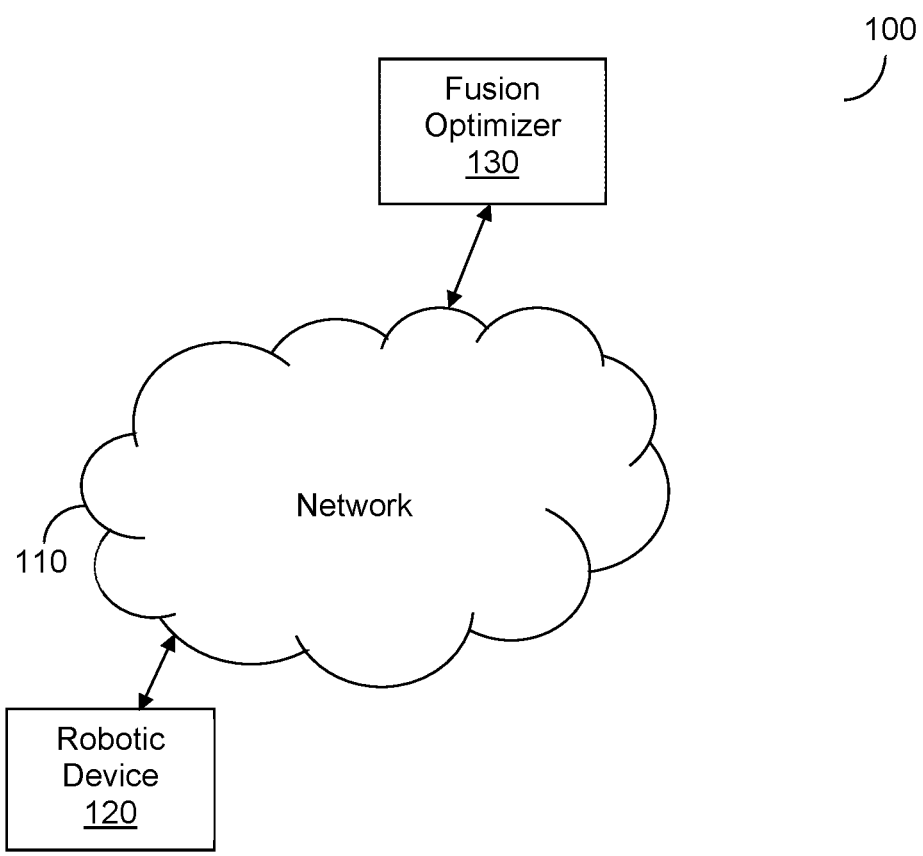
FIG. 1 is a network diagram utilized to describe some disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that, although sensor fusion can be used to improve accuracy of sensor readings by combining data from multiple data sources, bias caused by false readings of one of the data sources can actually reduce the accuracy of the result. It has further been identified that tracking sensor readings with respect to their locations of capture can be utilized to improve sensor fusion. Accordingly, the disclosed embodiments provide techniques for mapping sensor readings and utilizing such mapping in order to improve the results of sensor fusion.

The various disclosed embodiments include various techniques for improving sensor fusion using environmental parameter mapping. In various embodiments, environmental parameters measured by a navigating system are mapped. An environmental parameter is a value of a measurement that depends on position, orientation, or both, of the sensor capturing the measurements. The value of an environmental parameter does not change significantly over short periods of time (e.g., during a single navigation). The mapping includes storing the environmental parameters in a mapping data structure representing a map of an area in which the navigating system is moving. In an embodiment, the mapping data structure contains, for each measurement, a location at which the measurement was captured, a variance of the measurement, and a value of the measurement.

In an embodiment, the mapping may be utilized to improve sensor fusion by identifying measurements whose values deviate from normal values at the same location relative to the mapping. In another embodiment, values derived based on raw sensor readings may be incorporated into the mapping data structure based on the location(s) within the mapping at which their respective sensor readings were captured. In yet another embodiment, action-relevant data which may not be strictly related to navigation is incorporated into the mapping data structure, and such action-relevant data may be utilized to make decisions regarding navigation, actions, or both. In still another embodiment, the effective radius of tires or wheels of a robotic device is tracked by incorporating determined effective radius values into the mapping with respect to locations of the mapping, and the effective radius values may be utilized to improve accuracy of distance values calculated by the robotic device as it moves within the area.

The disclosed techniques provide a mapping data structure which can be manipulated for various purposes in order to improve navigation and, in particular, to improve accuracy of data used for navigation, thereby improving accuracy of navigation decisions and allowing for conserving navigation-related resources such as fuel and power. By mapping environmental parameters with respect to locations in an area, the accuracy of measurements used for making navigation-related calculations can be improved. For example, when invoking the mapping data structure to obtain a virtual measurement for a given location, the most likely value for the virtual measurement can be determined based on actual measurement values of locations close to a current location of a robotic device rather than simply using the actual measurement stored for that location (e.g., a value determined based on actual sensor signal readings captured at that location, a nearby location such as a location within a threshold distance of that location, sensor readings interpolated from multiple nearby locations, and the like). The most likely value, determined as described herein, will on average be more accurate than simply using the last recorded value since various factors may cause any individual measurement value or a determined location of a sensor capturing the measurement value to be inaccurate. Moreover, by averaging multiple actual measurement values in order to determine virtual measurements as described herein, noise is reduced. The disclosed embodiments further include techniques for filtering such a mapping data structure in order to conserve memory while maintaining accuracy of measurements stored therein.

More specifically, the disclosed embodiments provide techniques for rejecting outlier measurements by comparing current measurements to an environmental parameters map created as described herein. Additionally, the virtual measurements described herein are spatially consistent with respect to the same location, and therefore improve state estimations (e.g., state estimations used for navigation) based on such virtual measurements as compared to actual measurements. Further, the disclosed embodiments provide techniques for mapping environmental parameters accurately to allow for a robust suite of additional features.

FIG. 1 shows an example network diagram 100 utilized to describe the various disclosed embodiments. In the example network diagram 100, a robotic device 120 and a fusion optimizer 130 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The robotic device 120 is configured to perform locomotion and navigation. In an embodiment, the robotic device 120 is configured to perform at least some of the disclosed techniques based on measurements it collects during navigation. In another embodiment, the robotic device 120 is configured to send measurements collected during its navigation to the fusion optimizer 130, and the fusion optimizer 130 is configured to perform at least some of the disclosed techniques based on such measurements.

In some embodiments, the robotic device 120 may be further configured to perform actions such as, but not limited to, cleaning (e.g., vacuuming), lawncare (e.g., mowing), logistics (e.g., picking up and dropping off items), and the like. In accordance with at least some of the disclosed embodiments, decisions on whether and which actions to perform may be based on action-relevant data stored in a mapping data structure. This, in turn, may allow for making decisions which improve efficiency of the robotic device in ways such as, but not limited to, reducing fuel consumption or energy usage, more quickly completing navigation activities, combinations thereof, and the like.

It should be noted that FIG. 1 depicts the robotic device 120 communicating with a fusion optimizer 130 via a network 110 but that, at least in some embodiments (not shown), the robotic device 120 may be configured to perform at least some of the disclosed techniques and, therefore, communications with an external fusion optimizer may not be needed.

Figure 2:
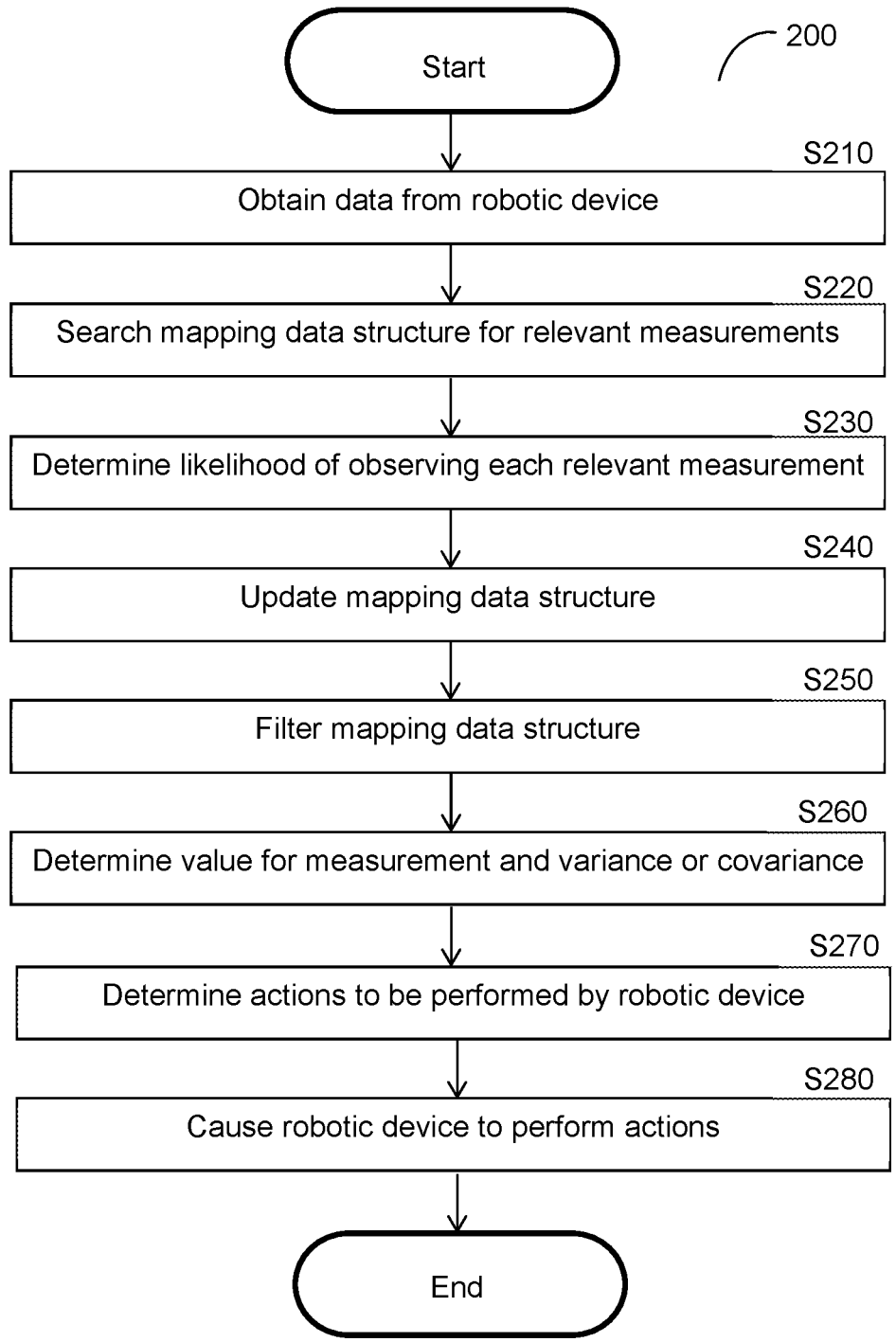
FIG. 2 is a flowchart illustrating a method for mapping environmental parameters according to an embodiment.

FIG. 2 is a flowchart 200 illustrating a method for mapping environmental parameters according to an embodiment. In an embodiment, the method is performed by the robotic device 120, FIG. 1. In another embodiment, the method is performed by the fusion optimizer 130, FIG. 1.

At S210, data collected or generated during navigation by a robotic device is obtained. The data collected during navigation at least includes position data of the robotic device at various points during navigation as well as one or more additional types of data in the form of environmental parameters representing attributes of the environment in which the robotic device navigated that are to be incorporated into a mapping data structure and used for one or more of the disclosed techniques. The environmental parameters to be included in the mapping data structure are implementation-dependent, and may include any or all of the types of data used for the various techniques described further below with respect to FIGS. 3-6. Specifically, the environmental parameters may include, but are not limited to, derived values determined based on raw sensor readings related to the environment, action-relevant data for the environment, effective radii, combinations thereof, and the like.

More specifically, in an embodiment, the additional data includes measurement values and a respective variance for each measurement value. Each measurement value and its respective variance are associated with a location occupied by the robotic device during navigation. The location may be expressed in formats such as, but not limited to, (x,y) or (x,y,z) coordinates defined relative to an origin point having, for example, coordinates (0,0) or (0,0,0). As a non-limiting example, the x coordinate may represent a distance along north or south direction of the origin point, the y coordinate may represent a distance along east or west direction of the origin point, and the z coordinate may represent a distance above or below the origin point. Consequently, in an example implementation, the obtained data includes a new measurement having a value w at location (x,y,z) with an uncertainty $(\sigma_w, \sigma_{x,y,z})$, where $\sigma_w$ is the uncertainty (i.e., the standard deviation) of the measurement w and $\sigma_{x,y,z}$ is the uncertainty of the location (x,y,z).

In another implementation, the new measurement may be a vector or higher degree tensor such as, but not limited to, a vector containing values which collectively represent a magnetic field. When a measurement is a vector or higher degree tensor, the measurement is transformed to real-world coordinates based on an estimated pose of the robotic device. The pose of the robotic device includes a position and an orientation of the robotic device.

In a further embodiment, the additional data may include values derived based on raw measurement values used for one of the techniques described further below. As a non-limiting example, incline values (which may be represented as vectors representing the direction of gravity, as measured by the robot) may be determined for different locations based on inertial measurement unit (IMU) measurements collected at those locations, and the incline values may also be stored alongside the measurements for each location in the mapping data structure. Storing derived values in the mapping data structure is described further below with respect to FIG. 4.

In another embodiment, the additional data may include action-related data used for making decisions related to performing actions such as how to navigate in order to perform such actions, whether to perform a given action, parameters for performing a given action, combinations thereof, and the like. As a non-limiting example, the additional data may include heights of grass (when travelling a lawn) determined based on images captured by cameras deployed on the robotic device, and the heights of grass may be used to make decisions such as whether to cut grass in a given location (e.g., by only cutting portions of grass having heights above a threshold). Incorporating and using action-related data with respect to a mapping data structure is described further below with respect to FIG. 5.

In yet another embodiment, the additional data may include effective radius of wheels or tires of the robotic device at various locations. The effective radius may, in turn, be utilized to more accurately calculate distance needed to travel for navigation purposes and, consequently, decisions such as how much to accelerate to move a distance needed for navigation. Tracking effective radius using a mapping data structure is described further below with respect to FIG. 6.

When the method is performed by the robotic device, S210 may include collecting the data. When the method is performed by an external system (i.e., a system which is external to the robotic device such as the fusion optimizer 130, FIG. 1), S210 may include receiving such data from the robotic device (e.g., over a network such as the network 110, FIG. 1).

At optional S220, a mapping data structure is searched for measurements which are relevant to a current location of a robotic device, i.e., measurements which may affect the values of the measured parameters. Such measurements may be determined based on their respective locations, their respective uncertainties, and the current location of the robotic device. In an example implementation, measurements which affect values of the measured parameters at the current location (x,y) include each measurement having a location (X,Y) such that $\sqrt{(X-x)^2+(Y-y)^2} < 2\sqrt{\sigma_{X,Y}^2+\sigma_{x,y}^2}$, where $\sigma_{x,y}$ and $\sigma_{X,Y}$ are the location uncertainties. In such an implementation, assuming normal probability distribution, the probability that a measurement affecting the current location is excluded from the mapping data structure is 0.05. In other implementations, different probabilities may be acceptable and, consequently, the requirements for measurements which affect the current location may differ.

At optional S230, the likelihood of observing at least a portion of the data obtained at S210 given the relevant measurements found at S220 stored in the mapping data structure is determined. In an embodiment, S230 includes modeling the correlation between measurements as a function of the distance between the respective locations of the measurements.

In an example implementation, given measurement v at location (x,y) with standard deviation $\sigma_v$, a virtual measurement is determined for location (x',y'), with the same value v, and standard deviation $\sigma_v(x', y')=\sigma_v(x,y)(1+f(d))$ where $d=\sqrt{(x-x')^2+(y-y')^2}$ is the distance and $f$ is some monotonically increasing function of d (e.g. a linear function $f(d)=\lambda d$). In other words, the standard deviation increases with the distance. In an embodiment, the criteria used to determine whether to include a measurement is modified to be $\sqrt{(X-x)^2+(Y-y)^2} < 2f(\sqrt{\sigma_{X,Y}^2+\sigma_{x,y}^2})$, such that, if $f(d)$ changes slowly, more distant measurements will be included. As a non-limiting example, the correlation between altitude measurements may be modeled using $f(d)=0.2d$, which implies that the average slope of the terrain is 20%. For each of the included (relevant) measurements, a virtual measurement is determined for the current location as described above. Since the model is Gaussian, the likelihood of observing a measurement v is readily computed. It is noted that it should be readily apparent to a person having ordinary skill in the art that different functions for modeling correlations between measurements based on distance may be utilized for different implementations.

At S240, a mapping data structure is updated to include at least a portion of the obtained data by adding one or more entries including respective portions of the obtained data to the mapping data structure. In an embodiment, each entry includes a position (e.g., a position of the navigating system at a point during navigation) and at least one additional portion of data corresponding to the position of the entry (e.g., a measurement value and corresponding variance determined for the position, values derived based on raw values of sensor data collected at the position, action-related data for the position, effective radius of wheels at the position, combinations thereof, and the like).

In embodiments where the likelihood of observing different measurements is determined at S230, if the likelihood determined for a measurement is below a predetermined threshold (e.g., 0.1), the measurement is rejected and not stored in the mapping data structure. Otherwise, the measurement is accepted and is stored in the mapping data structure. If no prior relevant measurement exists for a given location in the mapping data structure and a measurement having that location is included among the data obtained at S210, that measurement may be added to the mapping data structure even if its likelihood is below the threshold.

In another embodiment, values which deviate from a baseline or otherwise expected state may be rejected and not stored in the mapping data structure. Excluding values which deviate from a baseline or expected state is described further herein below with respect to FIG. 3.

It should be noted that, in some embodiments, steps S220 through S230 may not be performed and the data obtained at S210 may be stored in a mapping data structure without evaluating likelihood prior to such storage. As a non-limiting example, when a new mapping data structure is created (for example, when the robotic device is deployed for navigation in a new area), the mapping data structure will be empty and therefore does not need to be checked as described with respect to S220 through S230.

At optional S250, the mapping data structure may be filtered in order to replace multiple measurements stored for locations close to a given location (e.g., within a threshold distance of the given location) with a single representative measurement determined based on measurements stored in the mapping data structure. In some embodiments, such filtering may be performed when the number of distinct measurements stored for locations close to the given location is above a predetermined threshold (e.g., if at least 10 measurements are stored for locations within 10 centimeters of the given location). In an embodiment each of the replaced measurements may be replaced with a measurement having the highest likelihood (e.g., using the likelihoods determined at S230).

At optional S260, when the mapping data structure is invoked to determine a virtual measurement for a location (e.g., when the measurement is needed to determine navigation instructions or actions), a most likely value of the virtual measurement and the corresponding variance (or covariance if the value is not a scalar) at the location are determined. In an embodiment, S260 may include determining likelihoods of measurements with respect to (x,y) as described above with respect to S220 through S230, and the measurement having the highest likelihood is determined as most likely. When the method is performed by an external system to the robotic device, S260 may further include receiving a request for the measurement for (x,y) and sending the determined (virtual) measurement to the robotic device.

In an embodiment, S260 may further include sampling measurements from other locations near the location (e.g., within a threshold distance of the location) in order to determine an estimated value and corresponding variance or covariance to be utilized as the most likely value for the virtual measurement. Using sampling to determine an estimated value can allow for determining an appropriate value of the virtual measurement despite uncertainty in the location. In other words, when the location is somewhat uncertain, sampling from measurement values associated with multiple locations can be used to produce a virtual measurement and covariance. Additionally, even if the exact location is known, sampling may be used to reduce measurement noise.

Using a virtual measurement as described herein improves the navigation process in at least a few ways. First, using virtual measurements allows for rejecting false measurements (for example, as described with respect to S340, FIG. 3). Second, it allows for determining a virtual measurement when an actual sensor measurement is not available. For example, producing altitude measurement when GNSS signal is denied. Third, it allows for improving local measurement accuracy, as a result of the measurement averaging. Moreover, this improved local accuracy can be achieved without decreasing computational efficiency as would be required by some existing techniques such as global bundle adjustment. Sampling may be used for measurements such as, but not limited to, altitude (e.g., altitude measured by an altimeter, GNSS, or V-SLAM positioning sensor), surface normal vector (e.g., as measured by an inclinometer), and the like.

As a non-limiting example for sampling, the mapping data structure may store measurements including surface altitude values. When the robotic device needs to navigate through one or more locations, an estimated altitude at each of those locations may be determined by sampling from locations surrounding each of those locations, and the estimated altitudes are used for determining navigation decisions.

At S270, one or more actions to be performed by the robotic device are determined based on the mapping data structure. The determined actions may include, but are not limited to, navigation-related actions (like navigating to a certain location or changing routes) or one or more other actions which may require navigation (e.g., actions determined as described further below with respect to S540).

At S280, the determined actions are caused via the robotic device. In an embodiment when the method of FIG. 2 is performed by the robotic device, S280 includes performing the determined actions. Alternatively, S280 may include sending commands to perform the determined actions.

It should be noted that the mapping as described with respect to S210 through S250 may be performed at a distant time from the use of the mapping as described with respect to S260 through S280 without departing from the scope of the disclosure. It should also be noted that any or all of the steps of the flowchart 200 may be performed iteratively, and that the iterations of those steps are not necessarily performed in a particular order even if the initial iteration of those steps would logically require a particular order. Further, some steps may be performed more times than other steps (i.e., some iterations may only include performing some steps) without departing from the scope of the disclosure.

Figure 3:
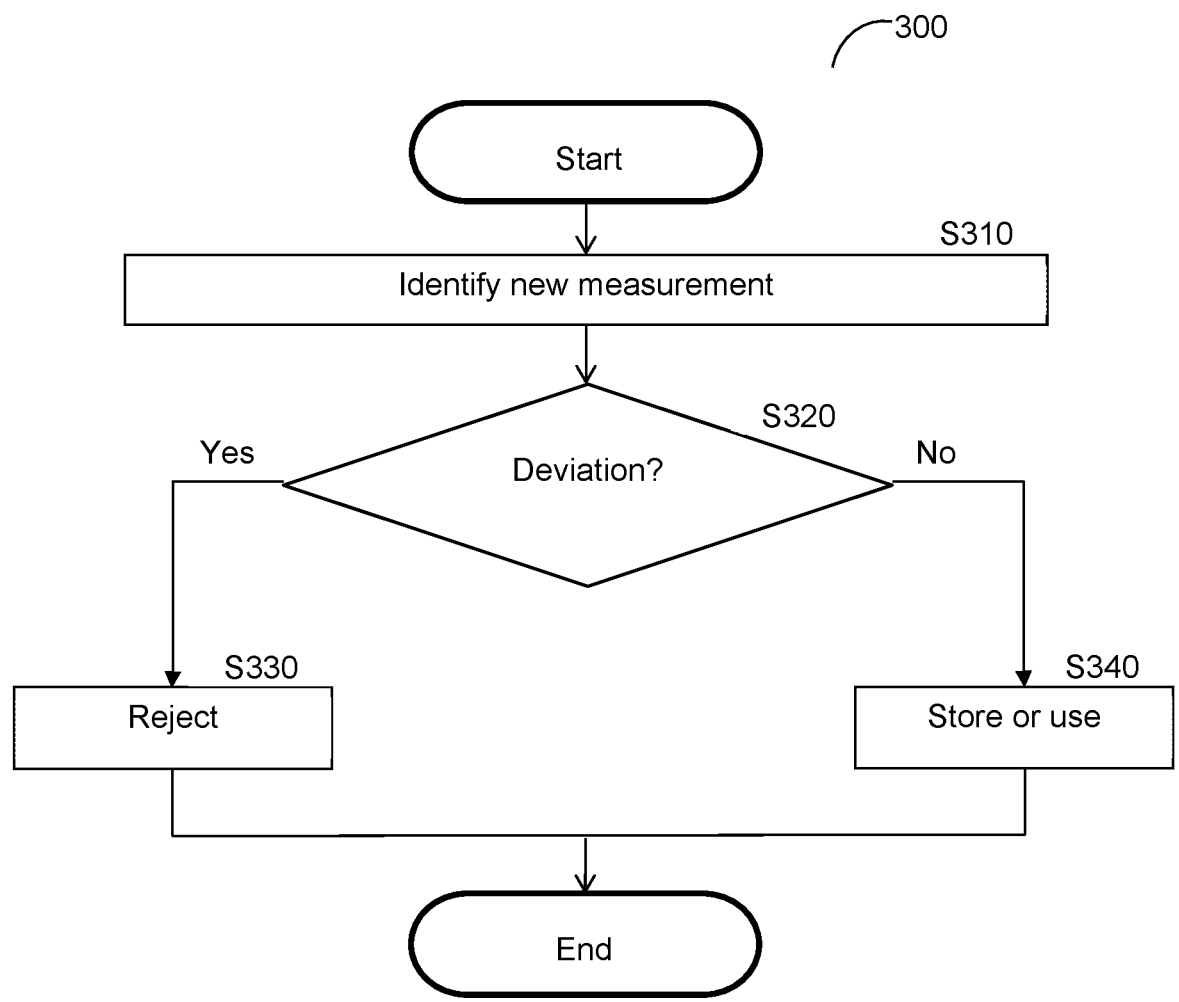
FIG. 3 is a flowchart illustrating a method for excluding deviating measurements from sensor fusion according to an embodiment.

FIG. 3 is a flowchart 300 illustrating a method for excluding deviating measurements from sensor fusion according to an embodiment. In an embodiment, the method is performed by the robotic device 120, FIG. 1. In another embodiment, the method is performed by the fusion optimizer 130, FIG. 1.

At S310, a new measurement is identified for a location. The new measurement is expressed as one or more values (e.g., a value, a vector, a higher degree tensor, and the like).

At S320, it is determined whether the new measurement deviates from a baseline or otherwise expected state. As described in S260, at the current position, a value and a corresponding variance or covariance are estimated. The current value is compared to the estimated value and, if the current value deviates from the estimated value above a threshold (e.g., by at least twice the accumulated standard deviation) it is rejected (S340). Otherwise, the current value is kept (S330). In an example implementation, S320 includes making the following comparison: $|V_{current} - V_{estimated}| < \sqrt{Var(V_{current}) + Var(V_{estimated})}$.

If the new measurement deviates, execution continues with S330; otherwise, execution continues with S340. The baseline or otherwise expected state is a "normal" value such as, but not limited to, one or more of the existing values stored in a mapping data structure (e.g., the mapping data structure generated as described above with respect to FIG. 2), one or more known baseline values, an expected value determined based on values stored in the mapping data structure, and the like. Whether the new measurement deviates from the baseline or expected state may be determined based on a predetermined threshold value or predetermined threshold proportion such that values of new measurements which are not within the threshold value or proportion of the baseline or expected value are determined to deviate from the baseline or expected value.

In an example implementation, the mapping data structure stores measurements including vectors representing magnetic fields used for calculating magnetic headings, and a new vector measurement representing the magnetic field at a location (x,y) is identified. If the new vector measurement deviates from the known magnetic field of the earth above a threshold, it is determined that the new vector measurement deviates from the baseline and it is rejected. As a non-limiting example, a distance may be determined between the new vector and a vector representing the known magnetic field of the earth. If such as distance is above a predetermined threshold, a deviation is determined and the new measurement is rejected.

In another example implementation, the mapping data structure stores measurements including altitudes of a robotic device and a new measurement. If the new measurement deviates from a known altitude for a location above a threshold, the new altitude measurement may be rejected or a virtual measurement may be determined based on altitude measurements stored with respect to locations near the location (e.g., within a threshold distance).

In this regard, it is noted that the geomagnetic field of the earth can be measured using a magnetometer and, because the magnetic field of the earth is known, magnetic north can be computed and used for navigation based on readings from a magnetometer and the known magnetic field of the earth. A challenge in using magnetometers for navigation is that some materials (e.g., ferromagnets) and electric currents can affect the ambient magnetic field. As a result, these materials and electric currents can create bias in magnetic north calculations. By excluding measurements of magnetic fields which deviate too much from the earth's known magnetic field, such bias can be reduced.

In another example implementation, the mapping data structure stores additional data including indicators of interference with a global navigation satellite system (GNSS) at various locations, and new data from the GNSS is identified. The new data may include internal accuracy state reporting measurements, a position measurement, or both. When the new data includes position measurements, it may be determined whether the location indicated by the position measurement has interference by comparing the position measurement to a position measurement collected by another data source (e.g., a V-SLAM positioning sensor). If the difference between the position measurements is above a threshold (e.g., higher than 3 standard deviations determined based on a mutual uncertainty of the sensors), the location will be determined as having interference and an indicator that the location has interference is stored in the mapping data structure with respect to the location. In addition, the GNSS receiver may report such interference and other measures of accuracy. Those measures may be used to map locations with poor GNSS position accuracy.

In this regard, it is noted that readings by a GNSS may be affected by objects which obstruct line of sight to satellites, the presence of materials that reflect or refract radio frequency waves, or other radio frequency interference. Such effects may cause GNSS degradation, thereby decreasing the accuracy of position readings. By tracking locations in which the navigating system is affected by interference, position values from those locations can be ignored in order to avoid use of inaccurate positions and, consequently, improve navigation decisions.

At S330, when it is determined that the new measurement deviates from the baseline or expected state, the new measurement is rejected and is not stored in the mapping data structure. At S340, when it is determined that the new measurement does not deviate from the baseline or expected state, the new measurement is added to the mapping data structure, used for navigation, or both.

Figure 4:
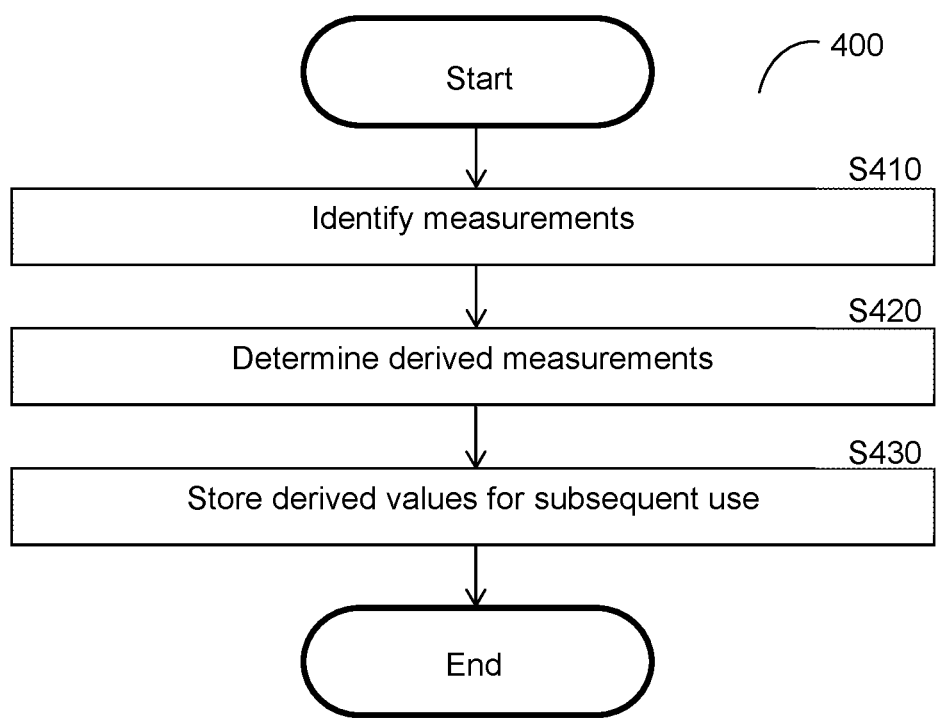
FIG. 4 is a flowchart illustrating a method for incorporating navigation-related values derived from raw sensor readings into sensor fusion according to an embodiment.

FIG. 4 is a flowchart 400 illustrating a method for incorporating navigation-related values derived from raw sensor readings into sensor fusion according to an embodiment. In an embodiment, the method is performed by the robotic device 120, FIG. 1. In another embodiment, the method is performed by the fusion optimizer 130, FIG. 1.

At S410, one or more measurements are identified. The identified measurements may be new measurements that were recently captured, measurements for a combination of locations which allows for determining a particular derived value (e.g., measurements for locations which are within a threshold distance of each other that are suitable for determining incline), both, and the like. Whether multiple measurements need to be identified for determining a given derived value is implementation-specific. As a non-limiting example, for calculating incline, at least two measurements indicative of height at different locations must be identified.

At S420, based on the identified measurements, one or more derived values is determined. As a non-limiting example, an incline value may be determined based on an IMU measurement for a location.

At S430, the derived value(s) are stored in the mapping data structure at respective locations. In an example implementation, each derive value is stored in a location associated with the measurement used to determine the derived value. In the non-limiting example in which an incline value is determined based on an IMU measurement for a location (x,y), the determined incline value may be stored in the mapping data structure with the location (x,y).

The derived values may be utilized to further improve navigation decisions. In the example noted above using IMU measurements to determine incline values for various locations, decisions about how much power is needed to climb up an incline, about whether to apply braking when moving down an incline, and the like, may be improved using the stored incline values for the locations in which the incline occupies.

Figure 5:
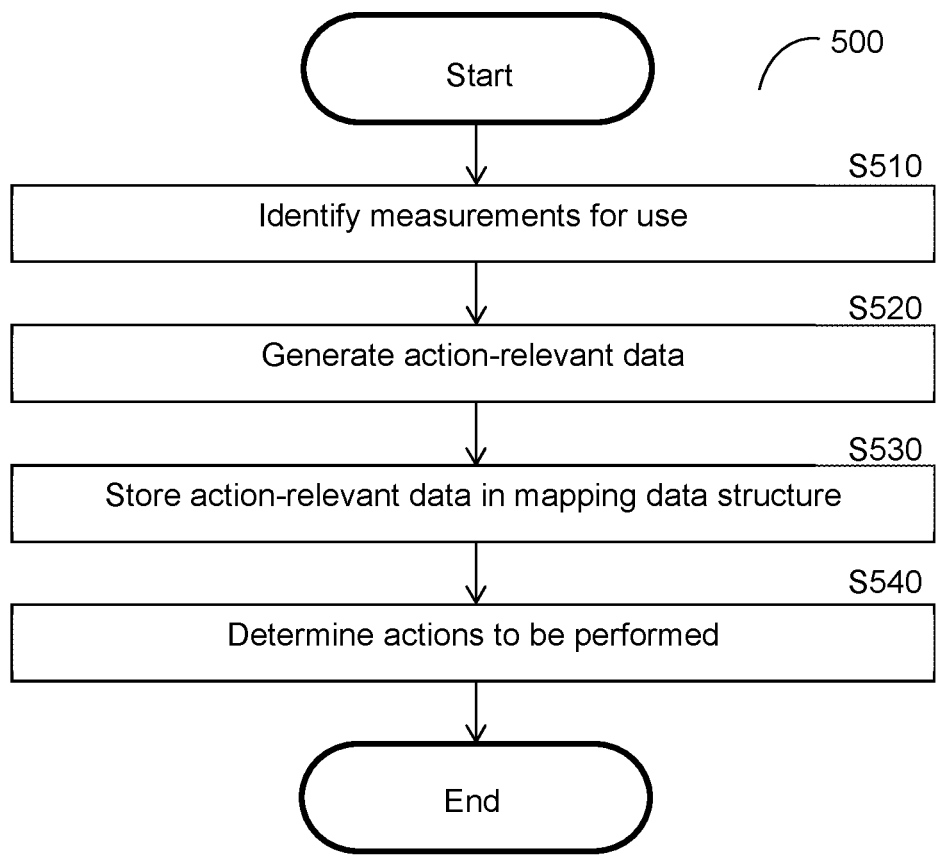
FIG. 5 is a flowchart illustrating a method for incorporating action-relevant data into sensor fusion for making decisions by a navigating system according to an embodiment.

FIG. 5 is a flowchart 500 illustrating a method for incorporating action-relevant data into sensor fusion for making decisions by a navigating system according to an embodiment. In an embodiment, the method is performed by the robotic device 120, FIG. 1. In another embodiment, the method is performed by the fusion optimizer 130, FIG. 1.

At S510, measurements to be used for generating action-relevant data are identified. The action-relevant data includes data needed for making decisions about performing actions other than solely navigating. In other words, the action-relevant data includes data needed to decide whether and which actions to perform instead of or in addition to navigating. As a non-limiting example, when the action-relevant data includes data to be used to make decisions related to mowing grass, the identified measurements may include heights measured by sensors at various locations within an area in which the robotic device is supposed to mow (e.g., within a predetermined area including a yard).

At S520, the action-relevant data is generated based on the identified measurements. As a non-limiting example, the action-relevant data may include grass height determined based on the heights measured by a sensor and a predetermined nominal height of the sensor.

At S530, the generated action-relevant data is stored in the mapping data structure such that each portion of the action-relevant data is stored with a respective location indicated in the mapping data structure. As a non-limiting example, a grass height determined based on a sensor height collected at a location is stored alongside the location in the mapping data structure.

At optional S540, one or more actions to be performed may be determined based on action-relevant data stored in the mapping data structure. Each determined action is associated with one or more locations indicated in the mapping data structure. To this end, the determined actions may further include navigating to such locations. As a non-limiting example, the determined actions may include mowing grass at one or more locations and navigating to those locations in order to allow for mowing the grass. In such an example, the efficiency of mowing may be improved by navigating to and mowing only locations where, for example, the grass height is above a predetermined threshold. This, in turn, may reduce wear and tear on mechanical components used for locomotion. Moreover, consumption of fuel and/or power may be conserved by avoiding navigating to locations in which actions do not need to be performed.

As a non-limiting example for incorporating action-relevant data into a mapping data structure, a sensor located on a wheeled robotic device acting may measure the height of the sensor from the surface. The height of the sensor from the contact point of the wheels with a completely rigid surface (also referred to as nominal height) may be pre-measured. The difference between the height measured by the sensor and the nominal height is an estimation of the surface response to the wheels' weight. For example, a lawnmower's wheels may press the grass towards the ground. The area of deformation will be essentially limited to the contact point of the wheels with the grass. For example, a stereo camera may be positioned on the lawnmower such that the traversed grass is visible to the camera. The camera video sequence may be analyzed to compute the vertical distance to the grass surface in the vicinity of the lawnmower. The difference between this height and the nominal height can be used as an estimation of the height of the grass.

The lawnmower may be configured such that the lawnmowing will be applied only to region were the grass height is above a predetermined threshold. This also allows a robotic lawnmower to adjust the mowing height to different areas according to a pre-defined map. Consider a robotic lawnmower that is additionally equipped with a positioning system (e.g., visual SLAM). Such a robotic lawnmower may create a map of the height of the grass by aggregating the grass height on a map at the position reported by the positioning system. The map may be further analyzed to monitor the health of the grass by locating areas with abnormal grass height. Another analysis may produce, by comparing the height changes over time, the rate of growth of the grass. The rate of growth may be further used for scheduling the frequency of the robotic lawnmower operation or to tune the amount of irrigation, fertilization, or both. Such a device may create a graphic display of grass height, growth, health, or a combination thereof, and present the graphic display to a human operator with alerts when those parameters are abnormal or otherwise above or below a predetermined threshold.

Figure 6:
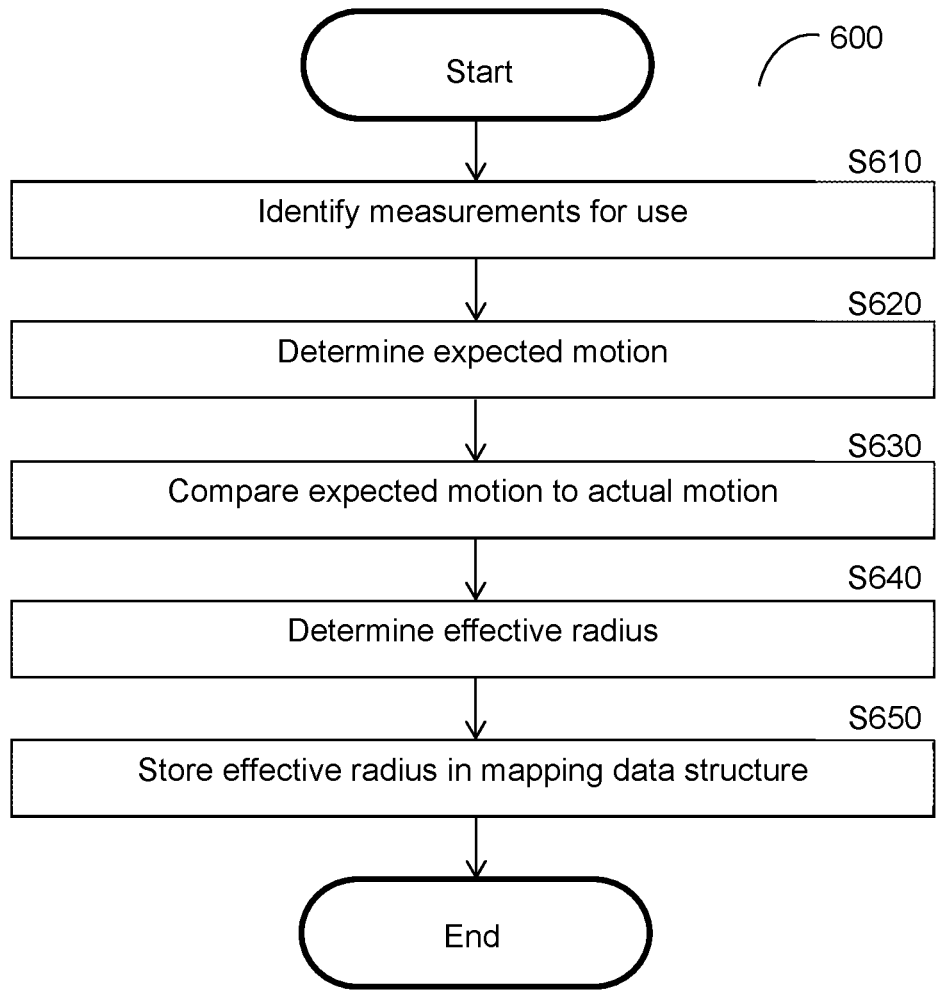
FIG. 6 is a flowchart illustrating a method for utilizing mapping to track effective radius according to an embodiment.

FIG. 6 is a flowchart 600 illustrating a method for utilizing mapping to track effective radius according to an embodiment. In an embodiment, the method is performed by the robotic device 120, FIG. 1. In another embodiment, the method is performed by the fusion optimizer 130, FIG. 1.

It is noted that, when a wheeled machine traverses over a non-rigid surface, the surface may deform due to pressure of the wheels on the surface. This, in turn, causes the motion during turning of the wheel to deviate such that the distance traveled via a single revolution of the tire is different than the ideal distance $2\pi R$ where R is the wheel radius. This deviation can be accounted for by determining an effective rolling radius, also referred to as an effective radius, and using the effective radius in order to determine the actual distance needed for navigation. It is further noted that the effective radius varies based on the surface being traversed and, therefore, changes based on the position of the robotic device (i.e., positions with different surfaces have different effective radii).

In this regard, it has been identified that a robotic device making navigation decisions based on the ideal radius rather than the effective radius for a given surface will not accurately determine the number of revolutions of the wheels needed to travel a given distance. Such inaccuracies may, for example, cause the robotic device to arrive at the wrong destination on the surface (which could, for example, cause actions to be performed at the wrong location), waste fuel or power by using more fuel or power than necessary to navigate to a particular location via the surface, combinations thereof, and the like. To this end, determining and storing effective radii values in a mapping data structure with respective locations allows for using such effective radii for making decisions related to navigating in those locations, thereby improving navigation.

At S610, measurements relevant for determining effective radii are identified. In an embodiment, such measurements include measurements collected by wheel encoders and position measurements collected by a position measuring system (e.g., GNSS, V-SLAM).

At S620, an expected motion between a set of locations is determined based on the wheel encoder measurements and a known nominal radius of the wheel. The expected motion represents the amount of distance that would be expected for the robotic device to traverse assuming an ideal surface such that the nominal radius is also the effective radius.

At S630, the expected motion for the set of locations is compared to an actual motion determined based on the position measurements between the set of locations. Such a comparison allows for determining an effect of the surface occupied by the set of locations on the motion of the robotic device.

At S640, an effective radius for the robotic device traversing the set of locations is determined based on the comparison.

At S650, the effective radius is stored in the mapping data structure. In an example implementation, the effective radius may be stored with each location of the set of locations. Once stored in the mapping data structure, the effective radius may be checked based on locations where the robotic device is traversing, thereby allowing for accurately calculating the number of rotations which will be necessary to traverse a given distance.

It should be noted that FIG. 6 is described with respect to effective radii merely for simplicity purposes, but that effective values for other circular measurements such as diameter may be equally utilized in accordance with the disclosed embodiments. Such other effective values may be determined by modifying the process for determining effective radius or determined based on the effective radius as would be apparent to a person having ordinary skill in the art. For example, the effective diameter may be determined by doubling an effective radius value determined as described above.

Figure 7:
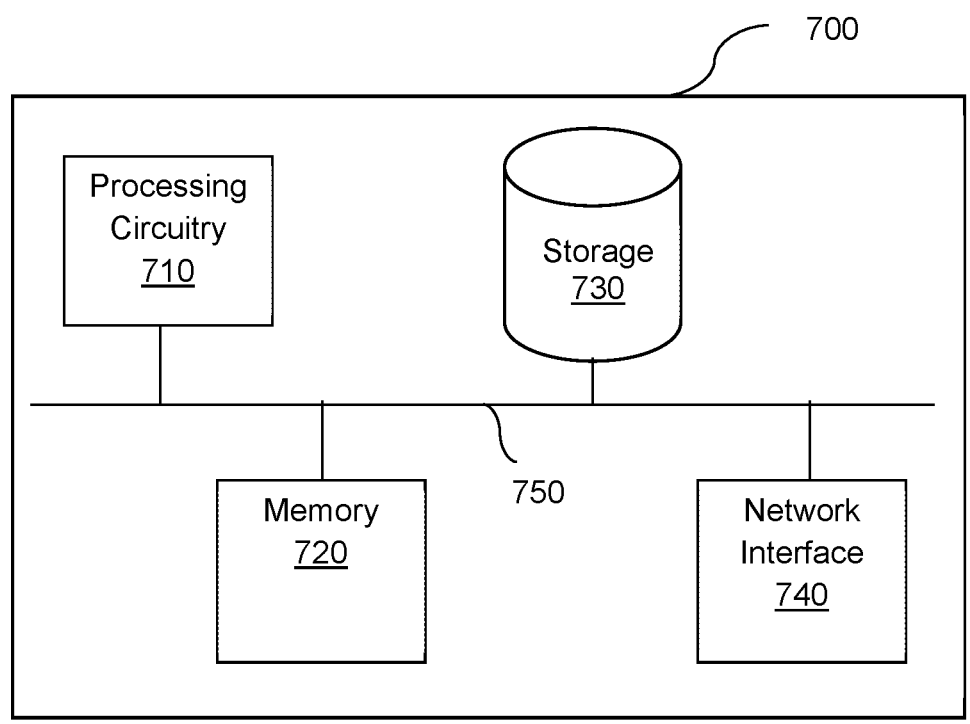
FIG. 7 is a schematic diagram of a system configured for environmental parameter mapping and sensor fusion optimization according to an embodiment.

FIG. 7 is an example schematic diagram of a system configured for environmental parameter mapping and sensor fusion optimization according to an embodiment. The system 700 may act as the fusion optimizer 130, FIG. 1. Alternatively or collectively, at least some of the components of the system 700 may be incorporated into the robotic device 120, FIG. 1, and the robotic device 120 may be configured to perform at least some of the disclosed embodiments.

In an embodiment, the system 700 includes a processing circuitry 710 coupled to a memory 720, a storage 730, and a network interface 740. In an embodiment, the components of the system 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the system 700 to communicate, for example, over the network 110, FIG. 1.

It should be understood that the embodiments described herein are not limited to the specific architecture illustrated in FIG. 7, and other architectures may be equally used without departing from the scope of the disclosed embodiments.

It should be noted that various disclosed embodiments refer to a "current" location of a robotic device for simplicity but that, in some implementations, the applicable location may be a previous location. It is noted that some implementations involve time-sensitive decisions which may require determinations in real-time, but that other implementations may not. The disclosed embodiments are equally applicable to any such implementations to the extent they can be practically applied thereto.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for environmental parameter mapping, comprising:
    adding at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position; and
    sending at least one command to the robotic device, wherein the at least one command is determined based on the mapping data structure and includes at least one command to navigate;
    determining a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements; and
    determining whether each of the plurality of first measurements has a probability above a threshold, wherein the at least one entry is determined based on each first measurement of the plurality of first measurements having a probability above a threshold.

2. The method of claim 1, further comprising:
    filtering the mapping data structure by replacing a first value stored in each of a plurality of entries of the mapping data structure with a second value, wherein the second value is determined based on the plurality of entries.

3. The method of claim 1, further comprising:
    determining a second value for a location based on the mapping data structure, wherein determining the second value further comprises sampling a plurality of first values from entries of the mapping data structure corresponding to respective positions within a threshold distance of the location, wherein an at least one action is determined based further on the second value.

4. The method of claim 1, further comprising:
    determining a probability of observing a plurality of new measurements based on an expected state of the robotic device, wherein the expected state includes at least one expected state value determined based on the mapping data structure, wherein the probability of observing each new measurement is determined based on a comparison between each new measurement and a respective value of the at least one expected state value, wherein the at least one entry is determined based on each new measurement having a probability above a threshold.

5. The method of claim 1, further comprising:
    determining at least one derived value based on measurements captured by the robotic device during navigation, wherein each derived value of the at least one derived value corresponds to a respective position of the robotic device during the navigation, wherein the at least one entry includes the at least one derived value and the corresponding position of each of the at least one derived value.

6. The method of claim 1, wherein the at least one environmental parameter of each of the at least one entry includes at least one portion of action-relevant data, wherein the action-relevant data includes data needed for making decisions related to actions other than solely navigating, wherein the at least one command further includes at least one command to perform an action determined based on the action-relevant data stored in the mapping data structure.

7. The method of claim 6, wherein each portion of action-relevant data includes a height of grass at a respective position indicated in the mapping data structure, wherein the at least one command to perform an action includes at least one command to mow grass at a position having a height of grass above a threshold.

8. The method of claim 1, further comprising:
    determining a radius value of wheels of the robotic device at each of at least one location, wherein the at least one entry includes each determined radius value.

9. A non-transitory computer readable medium having stored thereon instructions for causing a processing circuitry to execute a process, the process comprising:
    adding at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position;
    sending at least one command to the robotic device, wherein the at least one command is determined based on the mapping data structure and includes at least one command to navigate;
    determining a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements; and
    determining whether each of the plurality of first measurements has a probability above a threshold, wherein the at least one entry is determined based on each first measurement of the plurality of first measurements having a probability above a threshold.

10. A system for environmental parameter mapping, comprising:
    a processing circuitry; and
    a memory, the memory containing instructions that, when executed by the processing circuitry, configure the system to:

add at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position; and send at least one command to the robotic device, wherein the at least one command is determined based on the mapping data structure and includes at least one command to navigate;

determine a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements; and determine whether each of the plurality of first measurements has a probability above a threshold, wherein the at least one entry is determined based on each first measurement of the plurality of first measurements having a probability above a threshold.

11. The system of claim 10, wherein the system is further configured to:

Filter the mapping data structure by replacing a first value stored in each of a plurality of entries of the mapping data structure with a second value, wherein the second value is determined based on the plurality of entries.

12. The system of claim 10, wherein the system is further configured to:

determine a second value for a location based on the mapping data structure, wherein determining the second value further comprises sampling a plurality of first values from entries of the mapping data structure corresponding to respective positions within a threshold distance of the location, wherein an at least one action is determined based further on the second value.

13. The system of claim 10, wherein the system is further configured to:

determine a probability of observing a plurality of new measurements based on an expected state of the robotic device, wherein the expected state includes at least one expected state value determined based on the mapping data structure, wherein the probability of observing each new measurement is determined based on a comparison between each new measurement and a respective value of the at least one expected state value, wherein the at least one entry is determined based on each new measurement having a probability above a threshold.

14. The system of claim 10, wherein the system is further configured to:

determine at least one derived value based on measurements captured by the robotic device during navigation, wherein each derived value of the at least one derived value corresponds to a respective position of the robotic device during the navigation, wherein the at least one entry includes the at least one derived value and the corresponding position of each of the at least one derived value.

15. The system of claim 10, wherein the at least one environmental parameter of each of the at least one entry includes at least one portion of action-relevant data, wherein the action-relevant data includes data needed for making decisions related to actions other than solely navigating, wherein the at least one command further includes at least one command to perform an action determined based on the action-relevant data stored in the mapping data structure.

16. The system of claim 15, wherein each portion of action-relevant data includes a height of grass at a respective position indicated in the mapping data structure, wherein the at least one command to perform an action includes at least one command to mow grass at a position having a height of grass above a threshold.

17. The system of claim 10, wherein the system is further configured to:

determine a radius value of wheels of the robotic device at each of at least one location, wherein the at least one entry includes each determined radius value.

18. A method for environmental parameter mapping, comprising:

adding at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position;

sending at least one command to the robotic device, wherein the at least one command is determined based on the mapping data structure and includes at least one command to navigate;

determining a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements;

determining whether each of the plurality of first measurements has a probability above a threshold, wherein the at least one entry is determined based on each first measurement of the plurality of first measurements having a probability above a threshold; and determining a probability of observing a plurality of new measurements based on an expected state of the robotic device, wherein the expected state includes at least one expected state value determined based on the mapping data structure, wherein the probability of observing each new measurement is determined based on a comparison between the new measurement and a respective value of the at least one expected state value, wherein the at least one entry is determined based on each new measurement having a probability above a threshold.

19. A method for environmental parameter mapping, comprising:

adding at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position, wherein the at least one environmental parameter of each of the at least one entry includes at least one portion of action-relevant data, wherein the action-relevant data includes data needed for making decisions related to actions other than solely navigating, wherein each portion of action-relevant data includes a height of grass at a respective position indicated in the mapping data structure;

sending at least one command to the robotic device, wherein the at least one command is determined based on the mapping data structure and includes at least one command to navigate, wherein the at least one command further includes at least one command to perform an action determined based on the action-relevant data stored in the mapping data structure, wherein the at least one command to perform an action includes at least one command to mow grass at a position having a height of grass above a threshold;

determining a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements; and determining whether each of the plurality of first measurements has a probability above a threshold, wherein the at least one entry is determined based on each first measurement of the plurality of first measurements having a probability above a threshold.

20. A system for environmental parameter mapping, comprising:

a processing circuitry; and a memory, the memory containing instructions that, when executed by the processing circuitry, configure the system to:

add at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position;

send at least one command to the robotic device, wherein the at least one command is determined based on the mapping data structure and includes at least one command to navigate;

determine a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements;

determine whether each of the plurality of first measurements has a probability above a threshold, wherein the at least one entry is determined based on each first measurement of the plurality of first measurements having a probability above a threshold; and determine a probability of observing a plurality of new measurements based on an expected state of the robotic device, wherein the expected state includes at least one expected state value determined based on the mapping data structure, wherein the probability of observing each new measurement is determined based on a comparison between the new measurement and a respective value of the at least one expected state value, wherein the at least one entry is determined based on each new measurement having a probability above a threshold.

21. A system for environmental parameter mapping, comprising:

a processing circuitry; and a memory, the memory containing instructions that, when executed by the processing circuitry, configure the system to:

add at least one entry to a mapping data structure, wherein each of the at least one entry includes a respective position of a robotic device and at least one corresponding environmental parameter for the respective position of the robotic device, wherein each of the at least one corresponding environmental parameter of each of the at least one entry indicates an attribute of an environment at a corresponding position and is based on at least one sensor signal captured at the corresponding position, wherein the at least one environmental parameter of each of the at least one entry includes at least one portion of action-relevant data, wherein the action-relevant data includes data needed for making decisions related to actions other than solely navigating, wherein each portion of action-relevant data includes a height of grass at a respective position indicated in the mapping data structure;

send at least one command to the robotic device, wherein the at least one command is determined based on the mapping data structure and includes at least one command to navigate, wherein the at least one command further includes at least one command to perform an action determined based on the action-relevant data stored in the mapping data structure, wherein the at least one command to perform an action includes at least one command to mow grass at a position having a height of grass above a threshold;

determine a probability of observing a plurality of first measurements based on a plurality of second measurements at corresponding locations of the robotic device, wherein each of the plurality of first measurements is determined based on sensor signals captured by the robotic device, wherein each of the plurality of second measurements is stored in the mapping data structure with respect to a corresponding location of one of the plurality of first measurements; and determine whether each of the plurality of first measurements has a probability above a threshold, wherein the at least one entry is determined based on each first measurement of the plurality of first measurements having a probability above a threshold.

* * * * *